United States Patent [19]

Kobayashi et al.

[11] Patent Number: 4,583,163

[45] Date of Patent: Apr. 15, 1986

[54] DATA PREFETCH APPARATUS

[75] Inventors: Yoshiyuki Kobayashi, Kodaira; Nobuhiko Yamagami, Kunitachi; Jyun-ichi Kihara, Fuchu, all of Japan

[73] Assignee: Tokyo Shibaura Denki Kabushiki Kaisha, Kawasaki, Japan

[21] Appl. No.: 408,739

[22] Filed: Aug. 17, 1982

[30] Foreign Application Priority Data

Aug. 26, 1981 [JP] Japan ............................ 56-133493

[51] Int. Cl.⁴ ............................................. G06F 9/38
[52] U.S. Cl. .................................................. 364/200
[58] Field of Search ... 364/200 MS File, 900 MS File

[56] References Cited

U.S. PATENT DOCUMENTS 4,110,822 8/1978 Porter et al. .................. 364/200
4,225,922 9/1980 Porter .............................. 364/200
4,462,073 7/1984 Grondalski ..................... 364/200
4,489,378 12/1984 Dixon et al. ................... 364/200

*Primary Examiner*—Thomas M. Heckler
*Attorney, Agent, or Firm*—Kenyon & Kenyon

[57] ABSTRACT

A data prefetch apparatus provided between a main memory formed of a plurality of memory blocks and an I/O device whose data transfer speed is slower than that of the main memory, comprising an address counter for the main memory and a data buffer for storing the data prefetched from the main memory. In the data prefetch apparatus, a full/empty detector is connected to the data buffer and a memory block detector is connected to the address counter and the data prefetch is interrupted when the over-access of the one of the memory block is detected and is restarted when the data buffer is empty and data request is supplied from the I/O device.

4 Claims, 11 Drawing Figures

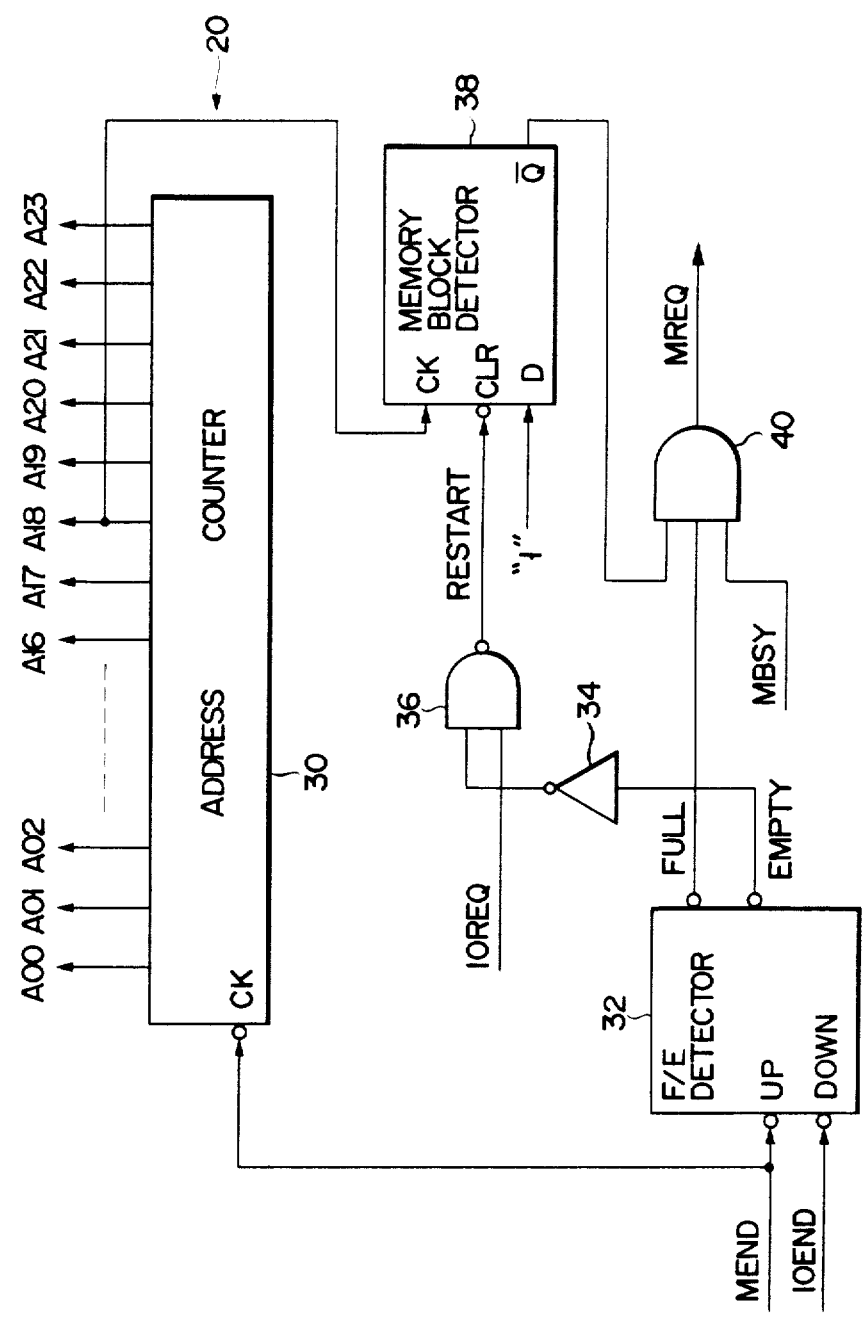
F I G. 2

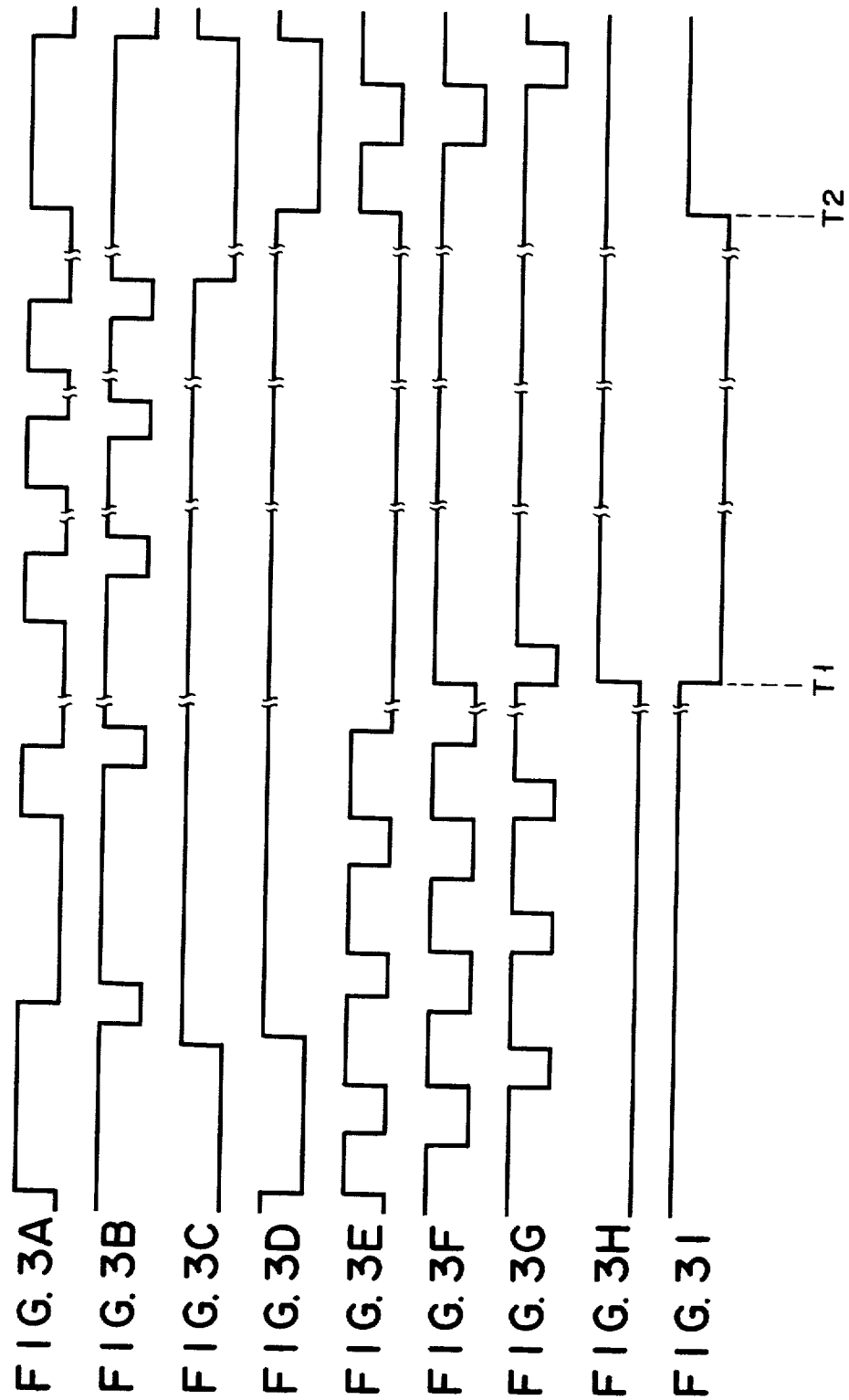

DATA PREFETCH APPARATUS

BACKGROUND OF THE INVENTION

The present invention relates to a data prefetch apparatus and, more particularly, to a data prefetch apparatus used for transferring data from a main memory to a peripheral unit.

In a data processing apparatus, a channel is generally arranged to perform data transfer between a main memory and a peripheral unit such as an input/output device (to be referred to as an I/O device hereinafter), independently of a central processing unit (to be referred to as a CPU hereinafter). A data buffer is arranged in the channel to perform high-speed data transfer. The data buffer stores memory data such as read data which is read out from the main memory to be transferred to the I/O device and write data which is transferred from the I/O device to be written in the main memory. Further, an address counter is arranged in the channel to generate a memory address in the main memory. For data transfer, a start address of a data transfer area of the main memory is set in the address counter. Every time the channel accesses the main memory to read out data therefrom, the address counter is incremented. A byte counter is arranged in an I/O controller to indicate the number of bytes of data to be transferred to the I/O device. Every time 1-byte data is transferred between the I/O device and the data buffer of the channel, the count of the byte counter is decremented. The I/O controller detects the count "0" of the byte counter and determines the termination of data transfer between the I/O device and data buffer.

For transferring data from the main memory to the I/O device, the channel generally prefetches data from the main memory if data transfer from the main memory to the I/O device is not completed and if data stored in the data memory is not full. It is known that the data transfer speed between the channel and the main memory is higher than that between the channel and the I/O device. By the time when all the transfer data from the main memory are supplied to the channel by memory data prefetch, data transfer from the data buffer of the channel to the I/O device is not completed. At this time, the count of the byte counter of the I/O controller is not "0". For this reason, the channel causes the address counter to increment until data transfer from the main memory to the I/O device is completed. Therefore, the channel prefetches data from a memory area exceeding the data transfer area of the main memory. As a result, when data transfer from the channel to the I/O device is completed, the count of the address counter may indicate a memory address which exceeds an end memory address (maximum possible address) of the main memory. In this case, a memory access error (over address error) occurs for the main memory. For designing a multiprocessing system having a common memory or a multiprocessing system which can access a memory of the other system, the over address error entails the following problem. Since the count of the memory address of the channel indicates the over address of the main memory, data in the memory of the other system or the common memory is erroneously read out. Therefore, if the over address access is left without any specific measure, trouble occurs when the memory of the other system is not connected to the multiprocessing system.

In order to solve the above problem, an end address register which stores the end address data and a comparator may be arranged in the channel. A memory address (B) indicated by the address counter is compared with the end memory address (A) stored in the end address register, by the comparator. A memory request is produced only if the memory address (B) is smaller than the end memory address (A). However, with this arrangement, an end address register and comparator which have a large capacity of bits are required, resulting in a complex system configuration. Further, the end memory address data must be preset in the end address register by programming. If the memory capacity of the main memory is changed, a new end memory address must be set in the end address register, thus requiring a cumbersome operation.

SUMMARY OF THE INVENTION

It is, therefore, an object of the present invention to provide a data prefetch apparatus which is capable of transferring data whose address is larger than a maximum address of a plurality of memory blocks constituting a main memory, even if the maximum memory address of the main memory is not set in an end address register.

In order to achieve the above object of the present invention, there is provided a data prefetch apparatus having a data buffer for prefetching a main memory and an address counter for specifying a memory address, of the main memory, and data prefetch apparatus transferring prefetch data to a peripheral unit or the like, comprising a full/empty detector for generating a full/empty signal which indicates a data storage state of the data buffer, circuit for incrementing a count of the address counter every time the main memory is accessed, memory block detector for detecting that an address signal from the address counter has exceeded a maximum address of memory blocks constituting the memory address, circuit for interrupting prefetch of data from the main memory by interrupting generation of a memory request signal in response to an output signal from the memory block detector, and circuit for restarting prefetch of the data from the main memory when an empty signal is produced from the full/empty detector after interruption of prefetch.

BRIEF DESCRIPTION OF THE DRAWINGS

FIG. 2 is a detailed circuit diagram of an embodiment of the data prefetch apparatus according to the invention shown in FIG. 1;

FIG. 3A is a timing chart of an I/O request signal IOREQ;

FIG. 3B is a timing chart of an I/O end signal IOEND;

FIG. 3C is a timing chart of an empty signal EMPTY from an F/E detector 32;

FIG. 3D is a timing chart of a restart signal RESTART from an NAND gate 36;

FIG. 3E is a timing chart of a memory request signal MREQ from an AND gate 40;

FIG. 3F is a timing chart of a memory busy signal MBSY;

FIG. 3G is a timing chart of a memory end signal MEND;

FIG. 3H is a timing chart of an output signal from the 18th-bit $A_{18}$ of an address counter 30; and FIG. 3I is a timing chart of an output signal from a memory block detector 38.

DETAILED DESCRIPTION OF THE PREFERRED EMBODIMENT

Figure 1:
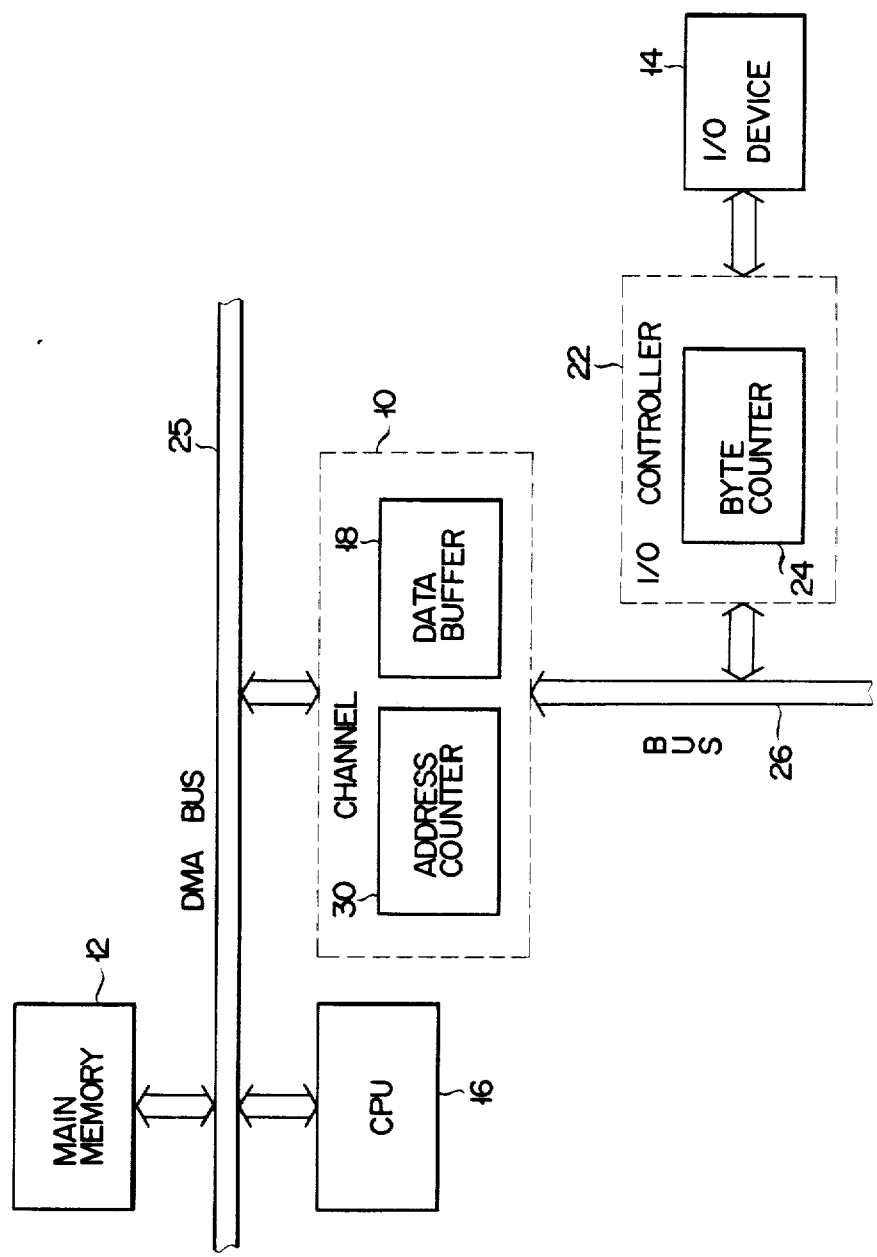
FIG. 1 is a block diagram showing the overall configuration of a data processor when a data prefetch apparatus according to the present invention is used as a channel of the data processor.

A data prefetch apparatus according to an embodiment of the present invention will be described with reference to the accompanying drawings. FIG. 1 is a block diagram showing the overall configuration of a data processor in which a channel for controlling data transfer between a main memory and an I/O device according to the present invention is used. Reference numerals 10, 12, and 16 respectively denote a channel, a main memory and a CPU. The channel 10, the main memory 12 and the CPU 16 are connected to a direct memory access bus 25. The channel 10 performs data transfer between the main memory 12 and a peripheral unit such as an I/O device 14, independently of operation of the CPU 16. The channel 10 has an address counter 30 and a data buffer 18. Read data prefetched from the main memory 12 and write data transferred from the I/O device 14 to be written in the main memory 10 is stored in the data buffer 18. The address counter 30 produces a memory address of the main memory 12. For transferring data from the main memory 12 to the I/O device 14, a start address of a data transfer area of the main memory 12 is set in the address counter 30. The count of the address counter 30 is incremented every time the channel 10 completes accessing the main memory 12. An I/O controller 22 is arranged between the channel 10 and the I/O device 14 via a bus 26. A byte counter 24 for counting the number of bytes of data to be transferred to the I/O device 14 is arranged in the I/O controller 22. Data representing the number of bytes of data to be transferred is set in the byte counter 24 in response to a command from the channel 10. The count of the byte counter 24 is incremented every time 1-byte data is transferred between the channel 10 and the I/O device 14. The I/O controller 22 detects the count "0" of the byte counter 24 so as to terminate data transfer between the I/O device 14 and the channel 10.

FIG. 2 is a detailed block diagram of the data prefetch apparatus which is arranged in the channel 10 shown in FIG. 1. The address counter 30 supplies memory address signals $A_{00}$ to $A_{23}$ to the main memory 12. The count of the address counter 30 is incremented in response to a memory end signal MEND (active low) which indicates the end of one memory cycle. The address counter 30 may comprise an SN74LS193 "synchronous 4-bit up/down counter" manufactured by Texas Instruments Inc. A full/empty detector 32 (to be referred to as an F/E detector 32 hereinafter) detects whether the data buffer 18 is full or not and empty or not. The F/E detector 32 may comprise an up/down counter (e.g., SN74SL193), and receives the memory end signal MEND at its up-count terminal and a byte-data transfer end signal IOEND (active low) at its down-count terminal. The count of the F/E detector 32 is incremented in response to the memory end signal MEND and is decremented in response to the byte-data transfer end signal IOEND. The byte-data transfer end signal IOEND indicates 1-byte data transfer from the data buffer 18 to the I/O controller 22. The F/E detector 32 produces a borrow signal in the counter as a buffer empty signal EMPTY (active low) which indicates the empty state of the data buffer 18. The F/E detector 32 further produces a carry signal in the counter as a buffer full signal FULL (active low) which indicates the full state of the data buffer 18.

A NAND gate 36 produces a RESTART signal for restarting data prefetch after temporary interruption. The NAND gate 36 receives an inverted signal of the EMPTY signal from the F/E detector 32 through an inverter 34 and a request signal IOREQ from the I/O controller 22. An output signal from the NAND gate 36 is supplied as a RESTART signal to a clear input terminal CLR of a memory block detector 38 which comprises a D flip-flop.

The memory block detector 38 may comprise one of a series of 54H/74H pulse-triggered J-K and edge-triggered D-type flip-flops manufactured by Texas Instruments Inc. The memory block detector 38 detects whether or not a memory address from the address counter 30 exceeds the boundary address of the memory blocks which constitute the main memory 12. In the above embodiment, a boundary address of each of the plurality of blocks which constitute the main memory 12 comprises 256 KB (K = 1024, B = 1 byte). Therefore, physical addresses within each memory block are (256K - 1) addresses (all the 18 bits are "1" in binary notation). When the memory address corresponds to the 256K-th address, the memory block boundary is detected. In the above embodiment, since data in the 18th bit $A_{18}$ (the least significant bit $A_{00}$ corresponds to the 0th bit) of the address counter 30 goes from logic level "0" to "1" when the memory address indicated by the count of the address counter 30 exceeds the 256K-th address, this positive-going transition is detected to detect the memory block boundary. A signal of logic level "1" is supplied to a data input terminal D of the memory block detector 38 which comprises a D flip-flop, and data of 18th bit $A_{18}$ of the memory address signal is supplied from the address counter 30 to a clock input terminal CK of the D flip-flop 38. The D flip-flop 38 is set by the positive-going data of 18th bit $A_{18}$. In this manner, the memory block detector 38 detects that the address which is indicated by the count of the address counter 30 has exceeded the memory block boundary.

An AND gate 40 is a control circuit for producing the memory request signal MREQ for data prefetch. The AND gate 40 receives the memory busy signal MBSY, an output $\overline{Q}$ from the memory block detector 38, and the buffer full signal FULL from the F/E detector 32. The memory busy signal MBSY is active low during the memory cycle. The AND gate 40 produces the received memory busy signal MBSY when $\overline{Q}$ = "1" and FULL = "1". Thus, the AND gate 40 supplies the memory request signal MREQ to the main memory 12 every time the memory cycle is completed.

The mode of operation of the data prefetch apparatus according to the embodiment of the present invention will be described with reference to timing charts in FIGS. 3A to 3I. Prior to data transfer, the I/O controller 22 sets a memory start address in the address counter 30 of the channel 10. The data request signal IOREQ of logic level "1" as shown in FIG. 3A is then produced. At this time, the data buffer 18 is empty, so that the buffer empty signal EMPTY (active low) of logic level "0" shown in FIG. 3C is produced by the F/E detector 32. Since the buffer empty signal EMPTY is inverted to a signal of logic level "1" by the inverter 34, the NAND gate 36 produces the restart signal RESTAT (active low) of logic level "0" shown in FIG. 3D. The memory block detector 38 which comprises the D flip-flop is reset by the restart signal RESTART. As a result, the output $\bar{Q}$ from the memory block detector 38 goes to logic level "1" and is supplied to the AND gate 40. The full signal FULL (active low) produced by the F/E detector 32 and received by the AND gate 40 is set to logic level "1" since the data buffer 18 is not full. The AND gate 40 is thus rendered conductive and produces the memory request signal MREQ (FIG. 3E) every time one memory cycle is completed in accordance with the memory busy signal MBSY (FIG. 3F). The memory cycle of the main memory 12 is initiated in response to the memory request signal MREQ. Thus, a start word is read out from the transfer data area of the main memory 12. The read data is transferred to the channel 10 through the DMA bus 25 and is stored in the data buffer 18. When one memory cycle is completed, the memory end signal MEND (active low) of logic level "0" (FIG. 3G) is supplied to the address counter 30 and to the F/E detector 32. The counts of the address counter 30 and the F/E detector 32 are incremented. The memory request signal MREQ is produced from the AND gate 40 every time one memory cycle is completed. The above operation is repeated. Meanwhile, data stored in the data buffer 18 is transferred on a first in/first out basis to the I/O controller 22 in units of bytes. Every time one-byte data is transferred from the data buffer 18 to the I/O controller 22, the byte-data transfer end signal IOEND shown in FIG. 3B is supplied to the F/E detector 32. The count of the F/E detector 32 is decremented.

Assume that a memory address indicated by the address counter 30 has exceeded the boundary of the memory block, that is, the 256K-th address of the main memory 12, at time T1 during data transfer control as described above. As shown in FIG. 3H, the signal corresponding to the 18th bit $A_{18}$ of the address counter 30 goes from logic level "0" to "1". The memory block detector 38 which comprises the D flip-flop is set by the above signal. The output $\bar{Q}$ of the memory block detector 38 goes low, as shown in FIG. 3I. As a result, the AND gate 40 is OFF after time T1, so that the memory request signal MREQ is not produced thereby. The data prefetch from the main memory 12 is interrupted. Meanwhile, the data transfer from the data buffer 18 to the I/O device 14 through the I/O controller 22 continues independently of interruption of data prefetch. When the number of bytes of data transferred from the data buffer 18 to the I/O controller 22 reaches a predetermined number, data transfer is terminated. The count of the byte counter 24 is decremented every time one-byte data is transferred. The I/O controller 22 terminates data transfer when the count of the byte counter 24 reaches zero.

In this manner, according to the present invention, when the value of the memory address signal produced from the address counter 30 exceeds the boundary of the memory blocks, data prefetch from the main memory 12 is interrupted. Therefore, memory access may not be performed for a memory area of an address larger than the end memory address of the main memory 12. When an address which is larger than the maximum address is accessed, data prefetch is interrupted, and no memory error occurs. Further, data of the capacity of the main memory 12, that is, the end memory address data of the main memory 12 need not be stored in the channel 10. Therefore, software of the system is simplified. Further, even if the capacity of the main memory 12 is changed, a change in the channel 10 need not be performed as long as the capacity of each memory block which constitutes the main memory 12 remains unchanged.

Even if memory data prefetch is interrupted and all the data stored in the data buffer 18 are transferred to the I/O device 14, the I/O controller 22 supplies the data request signal IOREQ (active high) of logic level "1" to the channel 10 if the count of the byte counter 24 is not zero. At time T2, since the data buffer 18 is empty, the buffer empty signal EMPTY (active low) of logic level "0" (FIG. 3C) is supplied from the F/E detector 32 to the NAND gate 36 through the inverter 34. As a result, the RESTART signal (active low) of logic level "0" (FIG. 3D) is supplied from the NAND gate 36 to the memory block detector 38, and the D flip-flop 38 is reset. The output $\bar{Q}$ of the memory block detector 38 is set to logic level "1". The AND gate 40 is rendered conductive again in response to the output $\bar{Q}$ of the logic level "1". The AND gate 40 produces the memory request signal MREQ (active high) (FIG. 3E) every time one memory cycle is completed. Thus, memory data prefetch is restarted, and data from the start address of the next memory block is sequentially read out.

What we claim is:

1. A data prefetch apparatus for prefetching data from a main memory constituted by a plurality of memory blocks, and transferring said data prefetched to an I/O device, comprising:
   a data buffer for prefetching data from said main memory and outputting said data prefetched to an I/O controller of said I/O device;
   an address counter for specifying an address of said main memory;
   full/empty detector means for generating a buffer full signal and a buffer empty signal which indicate data storage states of said data buffer;
   means for incrementing a count of said address counter every time memory access to said main memory is completed;
   memory block detector means for detecting an over address error when an address signal from said address counter specifies the address which is larger than a maximum address of one of said plurality of memory blocks constituting said main memory; and
   memory request controlling means for generating a memory request signal to said main memory for every memory access to said main memory when the buffer full signal is not produced from said full/empty detector means, and for interrupting generation of the memory request signal when a signal which indicates the over address error is detected by said memory block detector means.

2. A data prefetch apparatus according to claim 1, wherein said full/empty detector means comprises an up/down counter, a count of said up/down counter being incremented every time said memory access is completed and being decremented every time data transfer to said device is completed.

3. A data prefetch apparatus according to claim 2, wherein a borrow output from said up/down counter is produced as said buffer empty signal, and a carry output thereof is produced as said buffer full signal.

4. A data prefetch apparatus according to claim 1, wherein after generation of the memory request signal from said memory request controlling means is stopped and when the buffer empty signal is produced by said full/empty detector means in accordance with the data transfer from said data buffer to said device, a signal which indicates said over address error and is produced from said memory block detector means is reset to generate said memory request signal from said memory request controlling means, thereby restarting data prefetch.

* * * * *